United States Patent
Frigerio et al.

(10) Patent No.: US 10,773,487 B2
(45) Date of Patent: Sep. 15, 2020

(54) HEAT SHIELDING COMPOSITE CLOTH

(71) Applicant: Saes Getters S.p.A., Lainate (M) (IT)

(72) Inventors: Davide Frigerio, Inverigo (IT); Marco Citro, Varese (IT)

(73) Assignee: SAES GETTERS S.P.A., Lainate Mi (IT)

(*) Notice: Subject to any disclaimer, the term of this patent is extended or adjusted under 35 U.S.C. 154(b) by 16 days.

(21) Appl. No.: 16/611,562

(22) PCT Filed: Jul. 17, 2018

(86) PCT No.: PCT/IB2018/055273
§ 371 (c)(1),
(2) Date: Nov. 7, 2019

(87) PCT Pub. No.: WO2019/016689
PCT Pub. Date: Jan. 24, 2019

(65) Prior Publication Data
US 2020/0198289 A1 Jun. 25, 2020

(30) Foreign Application Priority Data
Jul. 19, 2017 (IT) .................... 102017000082051

(51) Int. Cl.
*B32B 5/26* (2006.01)
*A62B 17/00* (2006.01)
*A41D 31/06* (2019.01)

(52) U.S. Cl.
CPC .............. *B32B 5/26* (2013.01); *A62B 17/003* (2013.01); *A41D 31/065* (2019.02);
(Continued)

(58) Field of Classification Search
CPC .. A41D 31/065; A41D 31/00; A41D 31/0005; A41D 31/02; A41D 31/08;
(Continued)

(56) References Cited

U.S. PATENT DOCUMENTS

2004/0197519 A1* 10/2004 Elzey .................. B32B 3/28
428/68
2013/0239308 A1 9/2013 Baz et al.
(Continued)

FOREIGN PATENT DOCUMENTS

CN 105457179 A 4/2016
CN 105882095 A 8/2016
(Continued)

OTHER PUBLICATIONS

International Preliminary Report on Patentability, issued in PCT/IB2018/055273, dated Oct. 14, 2019.
(Continued)

*Primary Examiner* — Amy Vanatta
(74) *Attorney, Agent, or Firm* — Birch, Stewart, Kolasch & Birch, LLP

(57) ABSTRACT

The present invention relates to a heat shielding composite cloth (100) comprising at least one pair of layers (11, 12) movably connected to each other by one or more Shape Memory Alloy (SMA) wires (103). The invention also relates to garments incorporating such heat shielding composite cloth (100).

20 Claims, 5 Drawing Sheets

Figure 1:
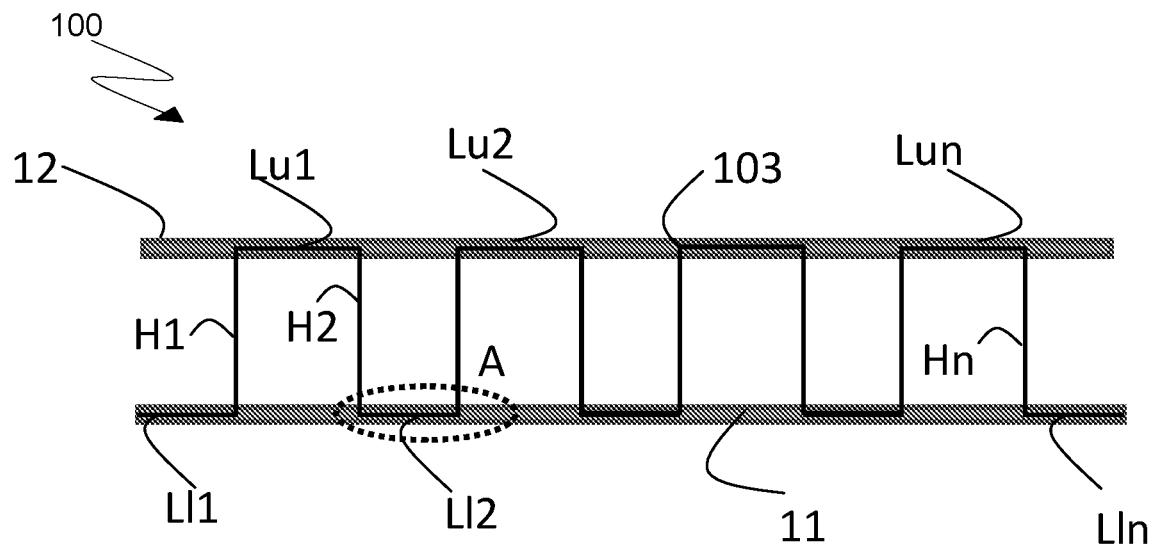

(52) U.S. Cl.
CPC ... *B32B 2262/101* (2013.01); *B32B 2307/304* (2013.01); *B32B 2307/3065* (2013.01); *B32B 2437/00* (2013.01)

(58) Field of Classification Search
CPC .. A41D 31/085; A41D 13/00; A41D 13/0015; A41D 1/04; A41D 19/00; A41D 19/0006; A41D 19/01529; A41D 19/015; A62B 17/0003; A62B 17/00; B32B 5/26; B32B 2437/00; B32B 2307/3065; B32B 2307/304; B32B 2262/101; B32B 2262/103; B32B 2307/30; B32B 7/05; B32B 7/08; B32B 7/04; B32B 5/00; Y10T 428/24025
USPC .......................................................... 428/101
See application file for complete search history.

(56) References Cited

U.S. PATENT DOCUMENTS

| | | | |
|---|---|---|---|
| 2013/0298317 A1 | 11/2013 | Fonte et al. | |
| 2014/0004295 A1* | 1/2014 | Kiederle | A62B 17/003 428/101 |
| 2014/0053311 A1* | 2/2014 | Nordstrom | A41D 1/00 2/69 |
| 2014/0087104 A1* | 3/2014 | Kierderle | A62B 17/003 428/35.2 |
| 2017/0066519 A1* | 3/2017 | Mabe | B32B 15/01 |
| 2018/0120062 A1* | 5/2018 | Citro | F41H 1/08 |
| 2018/0361704 A1* | 12/2018 | Jin | B29C 61/10 |

FOREIGN PATENT DOCUMENTS

| | | | | |
|---|---|---|---|---|
| CN | 106263125 A | | 1/2017 | |
| GB | 2312644 A | * | 11/1997 | ............... B32B 5/26 |
| WO | WO 99/05926 A1 | | 2/1999 | |
| WO | WO 2008/044814 A1 | | 4/2008 | |
| WO | WO 2008/044815 A1 | | 4/2008 | |
| WO | WO 2016/203344 A1 | | 12/2016 | |
| WO | WO 2017/096044 A1 | | 6/2017 | |

OTHER PUBLICATIONS

International Search Report, issued in PCT/IB2018/055273, dated Feb. 5, 2019.
Written Opinion of the International Preliminary Examining Authority, issued in PCT/IB2018/055273, dated May 31, 2019.
Written Opinion of the International Searching Authority, issued in PCT/IB2018/055273, dated Feb. 5, 2019.

* cited by examiner

HEAT SHIELDING COMPOSITE CLOTH

The present invention relates to a heat shielding composite cloth. In the frame of the present invention, the term "cloth" is analogous and equivalent to tissue, fabric, textile, web and the like.

Thermally responsive cloths such as heath shielding composite cloths are employed for example to manufacture gauntlets for workers operating on high temperature pipes, as well as fire fighter vests so as to protect a wearer from a high temperature environment or situation.

The working principle of heath shielding composite cloths is known in the art and consists in adjusting the distance between a pair of parallel layers made of a thermally insulating material that are restrained to each other by an element made of an intelligent material such as a shape memory material, typically a shape memory polymer or a shape memory alloy. By spacing the two layers away from each other it is possible to form an insulation gap between them, which enhances the insulating effect of the layers between an outer surface of the heat shielding composite cloth intended to be in contact with or close to an external environment and an inner surface of the heat shielding composite cloth intended to be in contact with or close to a user's body.

Shape memory alloys are characterized by a transition between two phases, one stable at a lower temperature, the so-called Martensite phase, one stable at a higher temperature, the so-called Austenite phase. A shape memory alloy is characterized by four temperatures, Mf, Ms, As, and Af, where Mf is the temperature below which the shape memory alloy is completely in the Martensite phase, i.e. it has a martensitic structure, while Af is the temperature above which the shape memory alloy is fully in the Austenite phase, i.e. it has an austenitic structure, whereas Ms, As are the temperatures at which the martensitic and austenitic transitions start, respectively. Wires made of a shape memory alloy, also known as SMA wires, can be trained to change their shape when temperature changes from below Mf to above Af, and viceversa. Processing and training of SMA wires are widely known procedures in the field, as exemplified by "Shape Memory Alloy Shape Training Tutorial" dating back to the Fall 2004 training section "ME559—Smart Materials and Structures".

The use of shape memory alloy wires for heath shielding composite cloths is disclosed in U.S. Pat. No. 6,312,784. However, this document only provides a generic disclosure of the fact that shape memory alloy filiform elements may be suitably employed for the manufacturing of these cloths, but does not provide enabling information on their essential constitutional features.

The international patent application WO 1999/005926 discloses the use of shape memory alloy elements for thermally adaptive systems, wherein shape memory alloy elements are used as inserts between a pair of layers.

The use of shape memory alloy elements in the manufacturing of heath shielding or insulating products is also disclosed in the international patent application WO 2008/044814, in the US patent application US 2013/023930, as well as in the international patent application WO 2017/096044.

The purpose of the present invention is to improve heat shielding composite cloths with the specific aim to achieve a reliable and consistent actuation over time and to better exploit the forces exerted by the shape memory alloy wires movably connecting to each other a pair of layers made of a thermally insulating material.

The invention consists in a heat shielding composite cloth comprising an upper layer and a lower layer that are made of a thermal insulating material and are movably connected to one another by one or more of Shape Memory Alloy (SMA) wires, characterized in that at a temperature equal to or above the Austenite phase temperature Af the following relationships are satisfied:

the ratio (Lu+Ll)/H is comprised between 0.1 and 10;
the ratio Lu/Ll is comprised between 0.1 and 10,
wherein:
Lu is the sum of lengths of the portions of shape memory alloy wires that are restrained to the upper layer over an area of 3 cm$^2$ of the composite cloth,
Ll is the sum of lengths of the portions of shape memory alloy wires that are restrained to the lower layer over the same area of 3 cm$^2$ of the composite cloth,
H is the sum of lengths of the portions of shape memory alloy wires that are arranged between the upper layer and the lower layer and are not restrained thereto over the same area of 3 cm$^2$ of the composite cloth,
the overall configuration of the heat shielding composite cloth being such that at a temperature equal to or above the Austenite phase temperature Af the distance between the upper and lower layers starting from a minimal distance comprised between 0 and 5 mm is increased by an amount comprised between 1 and 40 mm.

The minimal distance is referred to a temperature equal to or lower than the Martensite phase temperature Mf of the shape memory alloy.

Thanks to these features, the insulating performances of a heat shielding composite cloth can be remarkably improved while ensuring an adequate structural stiffness. It is thus possible to effectively employ the heat shielding composite cloth of the invention for the manufacturing of garments such as gauntlets for workers operating on high temperature pipes or fire fighter vests.

The ratio (Lu+Ll)/H is preferably comprised between 0.6 and 4, and the ratio between Lu/Ll is preferably comprised between 0.5 and 2.

Figure 2:
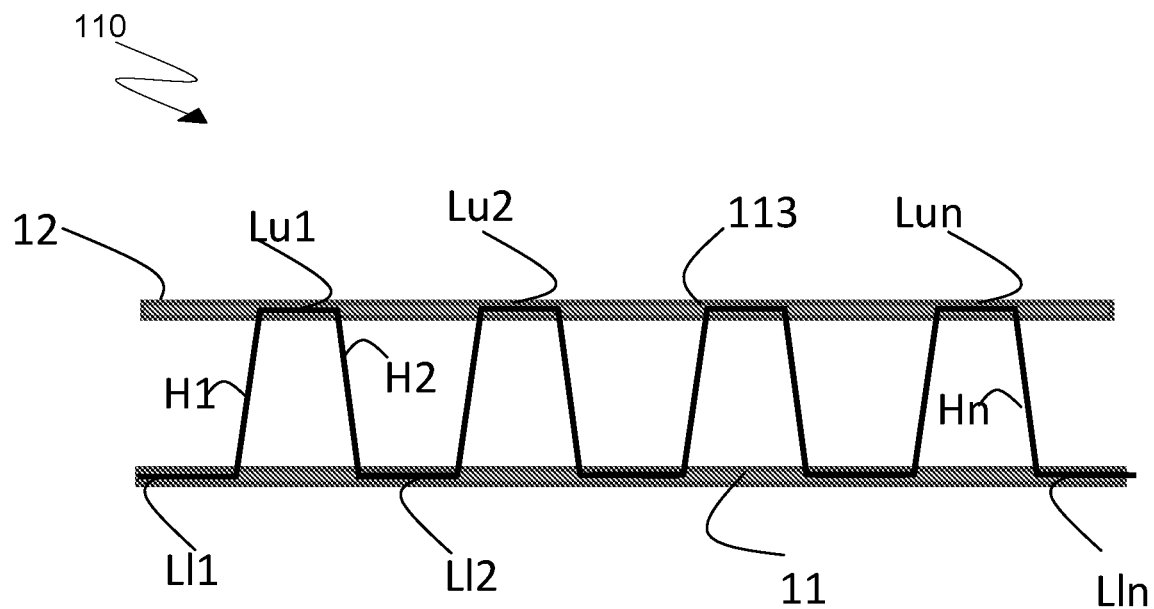
Figure 3:
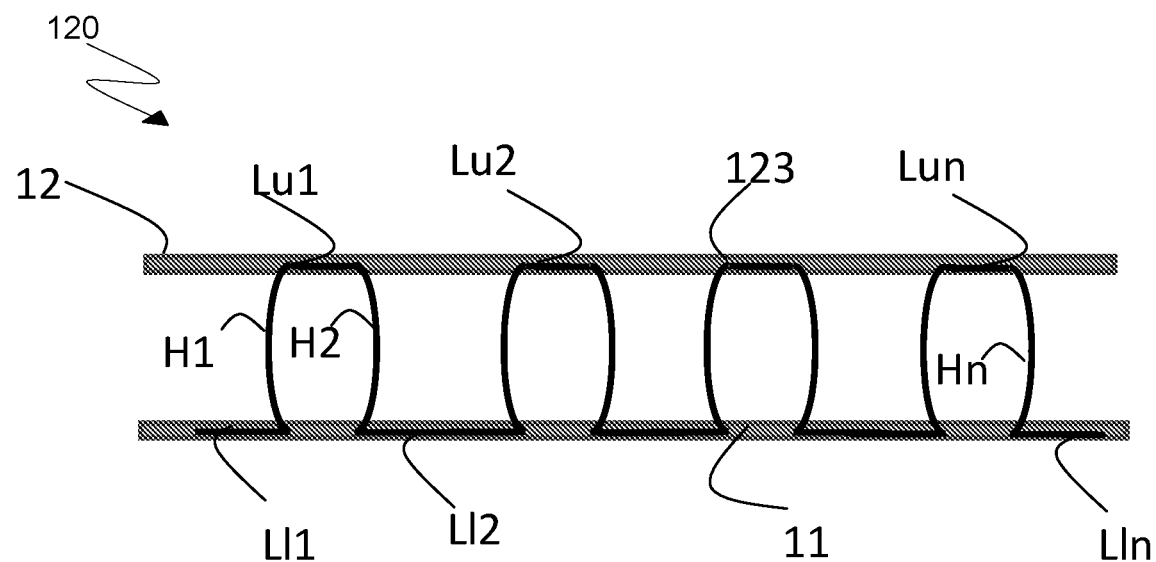
Figure 4:
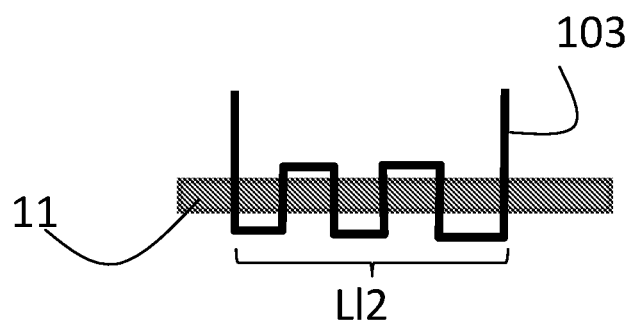
Figure 5:
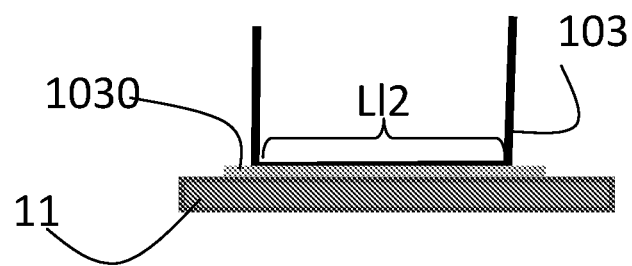
Figure 6:
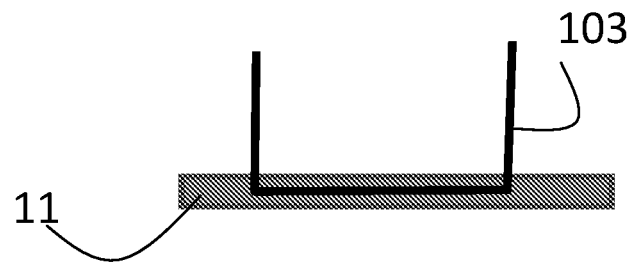
Figure 7:
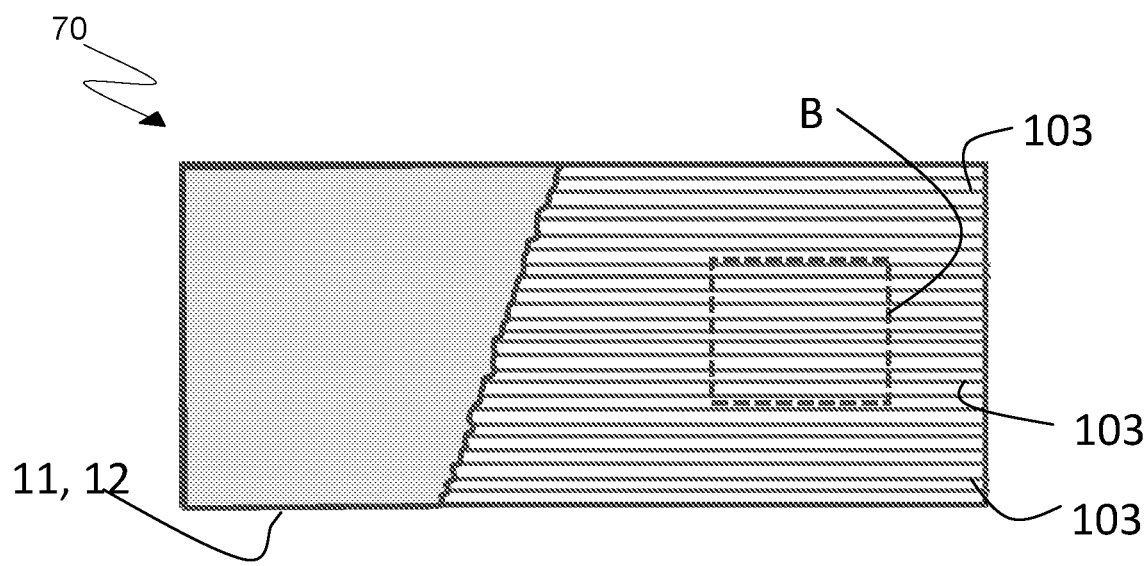
Figure 8:
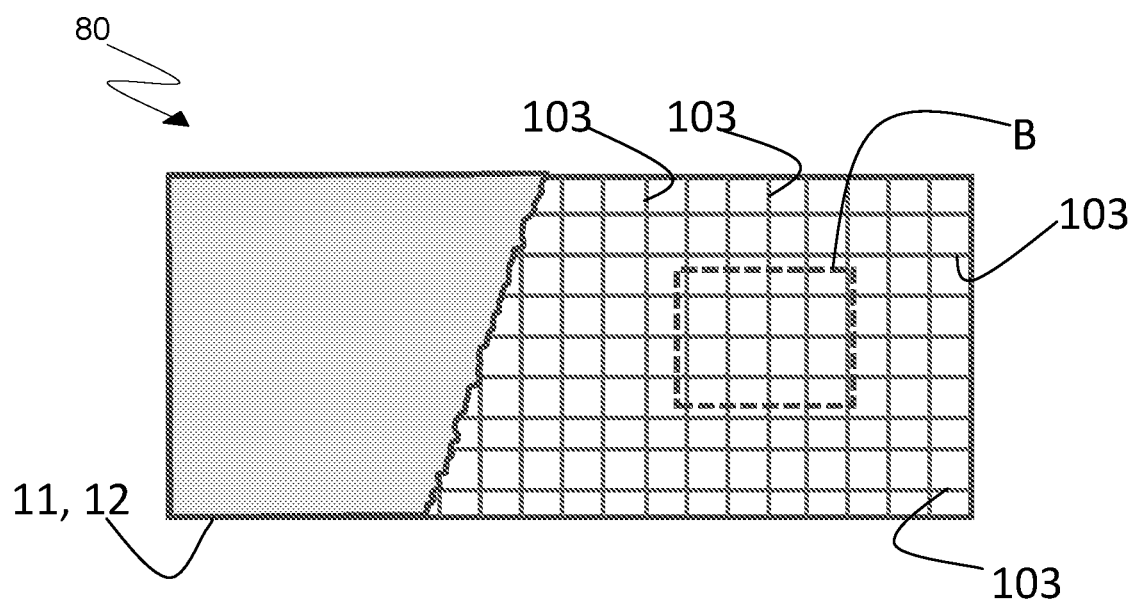
Figure 9:
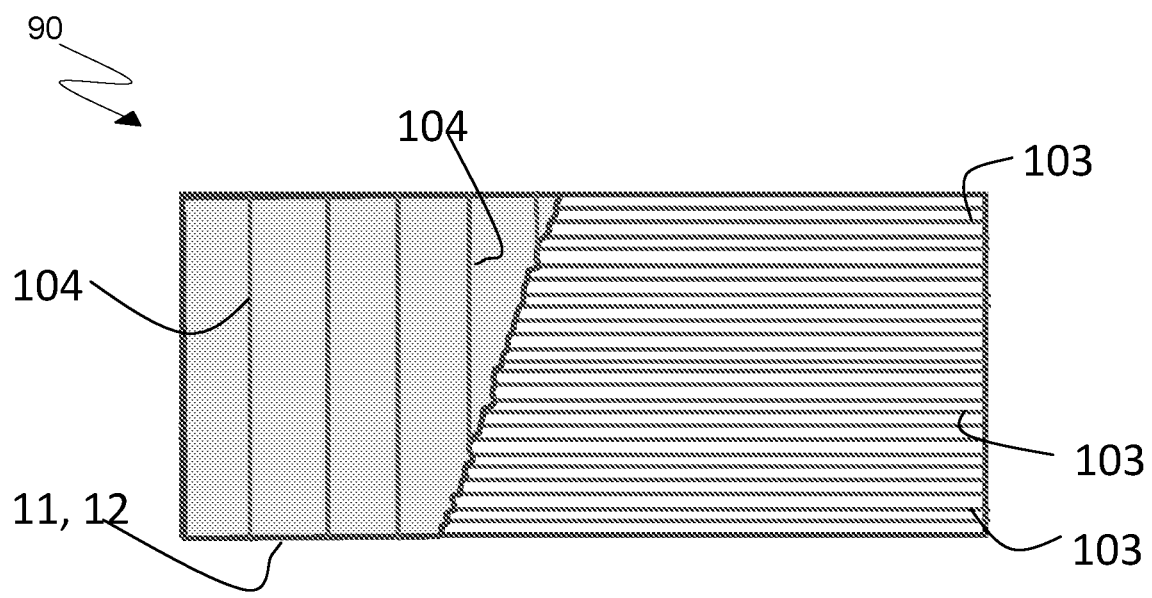

The invention will be further illustrated with the help of the following figures, wherein:

FIG. 1 is a schematic cross-sectional view of a portion of a heat shielding composite cloth according to an embodiment of the present invention, showing the composite cloth in an operating condition wherein the SMA wires are at a temperature above the Austenite temperature Af of the shape memory alloy of which they are made, FIG. 2 is a schematic cross-sectional view of a portion of a heat shielding composite cloth according to an alternative embodiment of the present invention, FIG. 3 is a schematic cross-sectional view of a portion of a heat shielding composite cloth according to a further embodiment of the present invention, FIGS. 4-6 are schematic cross-sectional detail views showing possible ways to restrain a SMA wire to the upper and lower layers of the heat shielding composite cloth of the present invention, FIGS. 7-9 show schematic partially broken top views of three different embodiments of the composite cloth according to the present invention.

In the figures the size of some components of the composite cloth such as, for example, the diameter of the shape memory alloy wires and the thickness of the upper layer and of the lower layer of the heat shielding cloth, has been altered in some cases so as to ease understanding of the invention.

The inventors have found that in order to improve a heat shielding composite cloth it is of the utmost importance to have a wide contact between the shape memory alloy (SMA) wires and the upper and lower layers, respectively, that are spaced away from each other when the SMA wires are heated from the Martensite phase temperature Mf of the shape memory alloy of which they are made, up to or above the Austenite phase temperature Af thereof, i.e. the actuation temperature.

A wide (long) contact between the shape memory alloy (SMA) wires and the upper and lower layers allows to avoid formation of localized stress points that may tear or break the layers, as well as to prevent SMA wires from being disengaged from them as a consequence of possible torn or broken portions. Tilting movements of the SMA wires of the composite cloth may also be effectively prevented.

Moreover, a wide contact allows to distribute homogeneously the stresses that are generated upon heating, i.e. during an actuation cycle of the SMA wires, as well as to improve stability of the composite cloth during subsequent actuation cycles of the SMA wires.

The overall performance of a garment employing a heat shielding composite cloth according to the invention is therefore more reliable and consistent over time than that of a prior art heat shielding composite cloth.

In the frame of the present invention the increase in the distance between the two layers of the composite cloth improves its thermal shielding ability. For this reason, it is important to define the minimal distance between the two layers of the cloth as those points/regions thereof having the highest thermal conductivity.

The minimal distance characterizes the configuration of the composite cloth when the SMA wires are not actuated, i.e. when they are at a temperature lower than the Martensite phase temperature Mf. In this configuration the layers of the composite cloth contact each other at least at some points or areas. It will be appreciated that in the regions where the shape memory alloy wires are arranged the two layers are slightly separated from each other, the gap size depending on the wire diameter.

When the composite cloth is actuated, i.e. when its temperature reaches the Austenite phase temperature Af or is higher than that, the SMA wires cause the layers to be spaced away from each other. In such a configuration the layers are substantially parallel to each other.

As shown in FIGS. 1 to 3, some portions of the SMA wires 103, 113, 123 having a length Ll are restrained to a lower layer 11, some other portions of the SMA wires 103, 113, 123 having a length Lu are restrained to an upper layer 12, and further portions of the SMA wires 103, 113, 123 having a length H are disposed between the two layers 11, 12.

According to the present invention the following relationships are satisfied in the actuated configuration, i.e. at or above the Austenite phase temperature Af:

$$0.1 \leq (Lu+Ll)/H \leq 10$$

$$0.1 \leq (Lu/Ll) \leq 10$$

As mentioned above, the overall configuration of the heat shielding composite cloth 100, 110, 120 is such that at a temperature equal to or above the Austenite phase temperature Af the distance between the upper and lower layers 11, 12 starting from a minimal distance comprised between 0 and 5 mm is increased by an amount comprised between 1 and 40 mm.

Reference will now be made to FIGS. 1 to 3, showing three embodiments of the composite cloth of the invention in an actuated configuration, i.e. at a temperature equal to or above the Austenite phase temperature Af. In this condition the layers 11, 12 are substantially parallel to each other. It will be appreciated that the wording "substantially parallel" encompasses possible slight variations of the relative distance between the layers due to e.g. manufacturing tolerances and boundary conditions, in particular close to the seams of a real product such as a gauntlet or a fire fighter vest.

FIG. 1 shows a schematic cross-sectional view of a composite cloth portion 100 having a lower layer 11 an upper layer 12 and at least one shape memory alloy wire 103 disposed between them. The layers 11, 12 are movably connected to each other by the shape memory alloy wire 103, as it will be explained in greater detail in the following.

The shape memory alloy wire 103 is shown in its fully actuated configuration, i.e. when the temperature of the composite cloth is equal to or higher than the Austenite phase temperature Af of the shape memory alloy of which the SMA wire is made.

More particularly, the portions of the shape memory alloy wire 103 that are restrained to the lower layer 11 have respective lengths Ll1, Ll2, . . . , Lln, the portions of the shape memory alloy wire 103 that are restrained to the upper layer 12 have respective lengths Lu1, Lu2, . . . , Lun, and the portions of the shape memory alloy wire 103 that are arranged between the lower layer 11 and the upper layer 12 have respective lengths H1, H2, . . . , Hn.

Still with reference to the relationships defined above, Ll is the sum of all the lengths Ll1, Ll2, . . . , Lln, while Lu is the sum of all the lengths Lu1, Lu2, . . . , Lun, and H is the sum of the lengths H1, H2, . . . , Hn all sums being referred to a same area of 3 cm$^2$ of the composite cloth.

This allows to take into account that there may be slight differences in such lengths due to manufacturing characteristics of a real object, without departing from the advantages of present invention as long as the limits expressed above are satisfied.

FIG. 2 and FIG. 3 respectively show schematic cross-sectional views of composite cloths 110 and 120, where the shape memory alloy wires 113, 123 have different actuated shapes. FIGS. 1-3 show the most preferred shapes for an actuated shape memory alloy wire incorporated in a composite cloth according to the present invention.

FIGS. 4-6 are detail views schematically showing different ways to restrain a shape memory alloy wire 103 to the lower and upper layers 11, 12 of the composite cloth of the invention. It is to be remarked that the present invention is not limited to any specific way to restrain the shape memory alloy wires 103, 113, 123 to the upper and lower layers 11 and 12, even though the ones depicted in FIG. 4-6 are the most preferred ones, more specifically:

In FIG. 4 the shape memory alloy wire 103 is sewn on e.g. the lower layer 11.

In FIG. 5 the shape memory alloy wire 103 is glued with an adhesive 1030 on the lower layer 11.

In FIG. 6 the shape memory alloy wire 103 is embedded in the lower layer 11.

In the context of the present invention there may be specific areas where the composite cloth does not contain any shape memory alloy wires, e.g. at boundary seams, so it is considered encompassed in the present invention a composite cloth fulfilling the above relationships in any of its units of area.

The present invention is not limited to a specific number of wires arranged between the upper and lower layers 11 and 12, even though it is preferred that the number of wires 103, 113, 123 is comprised between 1 and 200 over a square area B of 10 cm$^2$. These embodiments are schematically shown in the partially broken top views of FIGS. 7 and 8.

Preferably, the shape memory alloy wires 103 are disposed according to a parallel pattern, see element 70 of FIG. 7, or according to a grid-like pattern with 90° angles between crossing wires, see element 80 in FIG. 8. It is to be underlined that also other wires crossing dispositions, although less preferred, are possible, with intersecting wires not being perpendicular to each other. The composite cloth 70 shown in FIG. 7 contains eleven parallel shape memory alloy wires 103 in the area of square B of 10 cm$^2$, while the composite cloth 80 shown in FIG. 8 contains eight shape memory alloy wires (5 vertical, 3 horizontal) in the area of square B of 10 cm$^2$.

The preferred shape memory alloy wire diameter is comprised between 50 and 250 μm. As the shape memory alloy wires are real objects, departures from a circular section are possible, so the term diameter is to be intended as the diameter of the smallest enclosing circle.

The shape memory alloys preferably have a Martensite phase temperature Mf equal to or lower than 40° C. and an Austenite phase temperature Af equal to or higher than 60° C.

Suitable alloys having such temperatures are Ni—Ti based alloys such as Nitinol, with or without additional elements, such as Hf, Nb, Pt, Cu. The proper choice of alloy and its characteristics are known to those skilled in the art, see for example:

http://memry.com/nitinol-iq/nitinol-fundamentals/transformation-temperatures

According to an embodiment of the present invention a plurality of different shape memory alloy wires may be used to movably connect the upper layer and the lower layer to one another. The SMA wires may have different diameters and/or alloy composition (with different Mf, Af temperatures). In this case, the term "different diameters" for the SMA wires means that a SMA wire has a diameter that is at least ±10% with respect to another SMA wire, taking into account the standard wires diameter tolerance, while "different Mf, Af temperatures" means that the different types of SMA wires have at least ±10° C., preferably ±20° C., in Mf and/or Af to exploit the differential thermal actuation.

The present invention is not limited to any type of thermal insulating material for the composite cloth layers. Such materials may comprise glass-wool fibers, jute, aramid fibers, viscous rayon, any light flame retardant material, and their combinations.

According to an embodiment of the invention a further layer made of a thermal insulating material may be provided over one or both of the composite cloth layers on the external side thereof.

According to an embodiment of the invention shown in FIG. 9 the composite cloth 90 may comprise metallic wires 104 whose function is to increase its structural resistance. The metallic wires 104 may be e.g. shape memory alloy wires. FIG. 9 shows metallic wires 104 that are parallel to each other and perpendicular to the SMA wires 103, but the present invention is not limited to such a pattern nor to any specific wire arrangement.

According to an embodiment of the invention, for further improving the heat shielding properties of the composite cloth a thermally insulating gas may be arranged between the upper and lower layers. In another embodiment, a thermally insulating solid material is instead added between the upper and lower layers, such material shall be lightweight to avoid discomfort to the user, and for example may comprise glass-wool fibers, aramid fibers, viscous rayon, any light flame retardant material, jute and their combinations.

In this case the minimal distance between the lower layer and the upper layer is achieved when the temperature is below or at the Martensite phase temperature Mf, and is determined by the arrangement of the SMA wires and by the thickness of the additional material, while the distance between the lower layer and the upper layer in the actuated configuration, i.e. above the Austenite phase temperature Af, is determined by the actuation of the shape memory alloy wires.

According to an alternative embodiment of the invention, it is possible to use a plurality of composite cloths according to the present invention combined together, for example superimposed to each other by joining together the upper layer of a composite cloth with the lower layer of another composite cloth, or alternatively by using a same layer as the upper layer of one composite cloth and as the lower layer of an adjacent composite cloth. Composite cloths that need to be actuated/de-actuated at different temperatures, i.e. that employ shape memory alloy wires made of alloys having different Mf and Af temperatures, may thus be manufactured.

In a second aspect thereof, the invention relates to garments made with or incorporating one or more composite cloths according to the present invention. Gauntlets and fire fighters vests are among the most useful applications of the invention.

The invention will be further illustrated with the help of the following examples.

EXAMPLE 1 (SPECIMEN PREPARATION)

Different heath shielding composite cloth samples have been made all using equal upper and lower glass-fiber layers of grammage 300 g/m$^2$ each, with a square shape (150 mm×150 mm). The two layers are connected by shape memory alloy wires parallel to each other, having a diameter of 0.2 mm. All the specimens made were therefore realized with the same materials and all have the same amount and length of wires restrained in the upper and lower portions, i.e. Lu/Ll is equal to 1 for all of them, so the only differences were given by the (Lu+Ll)/H parameters as detailed in table 1 below.

| Specimen ID | (Lu + Ll)/H | Lu/Ll |
|---|---|---|
| S1 | 1,3 | 1 |
| C2 | 13 | 1 |

EXAMPLE 2 (SAMPLES TESTING)

Sample S1 and comparative sample C2 have been heated in order to actuate the SMA wires to achieve the improved heath shielding function by means of layer separation, the heating was made through an electric heating plate, previously stabilized to 300° C. temperature, positioned in contact with the lower layer of the sample.

Only sample S1, made according to the present invention, achieved an average lower and upper layer separation of 15 mm whereas in comparative sample C2 there is no active separation likely due to the weight of layers making the composite cloth that is too high to be overcome by the force exerted by the short lengths of the portions of the shape memory alloy wires that are arranged between the lower layer and the upper layer [note that the (Lu+Ll)/H ratio value of 13 means that only less than 8% of the wire is "free" and the rest is restrained to the layers].

Therefore, only sample S1 made according to the present invention and with the geometrical constitutional parameter properly set, is capable to achieve the improved heath shielding function sought.

The invention claimed is:

1. A heat shielding composite cloth (100; 110; 120; 70; 80; 90) comprising at least one pair of layers made up of an upper layer (12) and a lower layer (11) that are made of a thermal insulating material and are movably connected to one another by one or more shape memory alloy (SMA) wires (103, 113, 123), for which, at a temperature equal to or above the Austenite phase temperature (Af) of the shape memory alloy of which the wires (103, 113, 123) are made, the following relationship is satisfied:

the ratio Lu/Ll is comprised between 0.1 and 10, where:

Lu is the sum of lengths of the portions of shape memory alloy wires (103, 113, 123) that are restrained to the upper layer (12) over an area of 3 cm$^2$ of the composite cloth (100; 110; 120; 70; 80; 90), Ll is the sum of lengths of the portions of shape memory alloy wires (103, 113, 123) that are restrained to the lower layer (11) over said area of 3 cm$^2$ of the composite cloth (100; 110; 120; 70; 80; 90), the shape memory alloy wires (103, 113, 123) being arranged parallel to each other (70; 90) or disposed according to a grid pattern (80), wherein the number of shape memory alloy wires (103, 113, 123) portions over a square area of 10 cm$^2$ of the composite cloth (100; 110; 120; 70; 80; 90) is comprised between 1 and 200, characterized in that also the following relationship is satisfied:

the ratio (Lu+Ll)/H is comprised between 0.1 and 10; where:

H is the sum of lengths of the portions of shape memory alloy wires (103, 113, 123) that are arranged between the upper layer (12) and the lower layer (11) and are not restrained thereto over said area of 3 cm$^2$ of the composite cloth (100; 110; 120; 70; 80; 90), the overall configuration of the heat shielding composite cloth (100; 110; 120; 70; 80; 90) being such that, at a temperature equal to or above the Austenite phase temperature (Af), the distance between the upper (12) and lower (11) layers is increased starting from a minimal distance comprised between 0 and 5 mm by an amount comprised between 1 and 40 mm.

2. The composite cloth (100; 110; 120; 70; 80; 90) according to claim 1, wherein the ratio between (Lu+Ll)/H is comprised between 0.6 and 4 and the ratio between Lu/Ll is comprised between 0.5 and 2 over said area of 3 cm$^2$ of the composite cloth (100; 110; 70: 80; 90).

3. The composite cloth (100; 110; 120; 70; 80; 90) according to claim 1, wherein the shape memory alloy wires (103, 113, 123) are disposed according to a grid pattern (80) with 90° angles between crossing wires.

4. The composite cloth (100; 110; 120; 70; 80; 90) according to claim 1, wherein the diameters of the shape memory alloy wires (103, 113, 123) are comprised between 50 and 250 μm.

5. The composite cloth (100; 110; 120; 70; 80; 90) according to claim 1, wherein the Martensite phase temperature (Mf) of the shape memory alloy of which the wires (103, 113, 123) are made is equal to or lower than 40° C. and the Austenite phase temperature (Af) of said shape memory alloy is equal to or higher than 60° C.

6. The composite cloth (100; 110; 120; 70; 80; 90) according to claim 1, wherein a thermally insulating gas is present between the upper layer (12) and the lower layer (11), and wherein the minimal distance between the upper layer (12) and the lower layer (11) at a temperature lower than the Martensite phase temperature (Mf) is determined by the diameter of the shape memory alloy wires (103, 113, 123).

7. The composite cloth (100; 110; 120; 70; 80; 90) according to claim 1, wherein a thermally insulating solid material is arranged between the upper layer (12) and the lower layer (11).

8. The composite cloth (100; 110; 120; 70; 80; 90) according to claim 1, wherein the upper layer (12) and the lower layer (11) are movably connected to each other by a plurality of shape memory alloy wires (103, 113, 123) and wherein at least one of said shape memory alloy wires (103, 113, 123) has a diameter different from the diameters of the other shape memory alloy wires (103, 113, 123) by at least 10%.

9. The composite cloth (100; 110; 120; 70; 80; 90) according to claim 1, wherein the upper layer (12) and the lower layer (11) are movably connected to each other by a plurality of shape memory alloy wires (103, 113, 123) and wherein at least one of said shape memory alloy wires (103, 113, 123) has a difference of at least ±10° C., in Martensite phase temperature (Mf) and/or in Austenite phase temperature (Af) with respect to the other shape memory alloy wires (103, 113, 123).

10. The composite cloth (100; 110; 120; 70; 80; 90) according to claim 1, comprising two or more pairs of upper layers (12) and lower layers (11) superimposed to each other and wherein an upper layer (12) of a pair of layers (11, 12) is joined to a lower layer (11) of an adjacent pair of layers (11, 12).

11. The composite cloth (100; 110; 120; 70; 80; 90) according to claim 1, comprising two or more pairs of upper layers (12) and lower layers (11) superimposed to each other and wherein the upper layer (12) of one pair of layers (11, 12) is also the lower layer (11) of an adjacent pair of layers (11, 12).

12. A garment comprising the heat shielding composite cloth (100; 110; 120; 70; 80; 90) according to claim 1.

13. The garment according to claim 12, wherein said garment is a gauntlet.

14. The garment according to claim 12, wherein said garment is a part of a fire fighter vest.

15. A composite cloth (100; 110; 120; 70; 80; 90) according to claim 2, wherein the shape memory alloy wires (103, 113, 123) are disposed according to a grid pattern (80) with 90° angles between crossing wires.

16. A composite cloth (100; 110; 120; 70; 80; 90) according to claim 2, wherein the diameters of the shape memory alloy wires (103, 113, 123) are comprised between 50 and 250 μm.

17. A composite cloth (100; 110; 120; 70; 80; 90) according to claim 3, wherein the diameters of the shape memory alloy wires (103, 113, 123) are comprised between 50 and 250 μm.

18. A composite cloth (100; 110; 120; 70; 80; 90) according to claim 2, wherein the Martensite phase temperature (Mf) of the shape memory alloy of which the wires (103, 113, 123) are made is equal to or lower than 40° C. and the Austenite phase temperature (Af) of said shape memory alloy is equal to or higher than 60° C.

19. A composite cloth (100; 110; 120; 70; 80; 90) according to claim 3, wherein the Martensite phase temperature (Mf) of the shape memory alloy of which the wires (103, 113, 123) are made is equal to or lower than 40° C. and the Austenite phase temperature (Af) of said shape memory alloy is equal to or higher than 60° C.

20. A composite cloth (100; 110; 120; 70; 80; 90) according to claim 4, wherein the Martensite phase temperature (Mf) of the shape memory alloy of which the wires (103, 113, 123) are made is equal to or lower than 40° C. and the Austenite phase temperature (Af) of said shape memory alloy is equal to or higher than 60° C.

* * * * *